F. K. VREELAND.
RECEIVING SYSTEM FOR RADIO TELEGRAPHY AND TELEPHONY.
APPLICATION FILED FEB. 17, 1917.
1,407,103.
Patented Feb. 21, 1922.
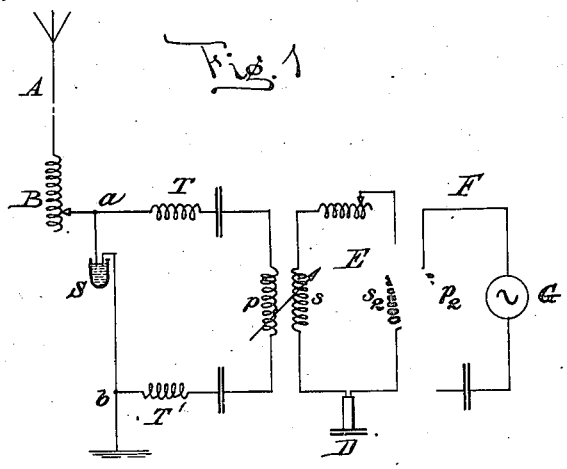
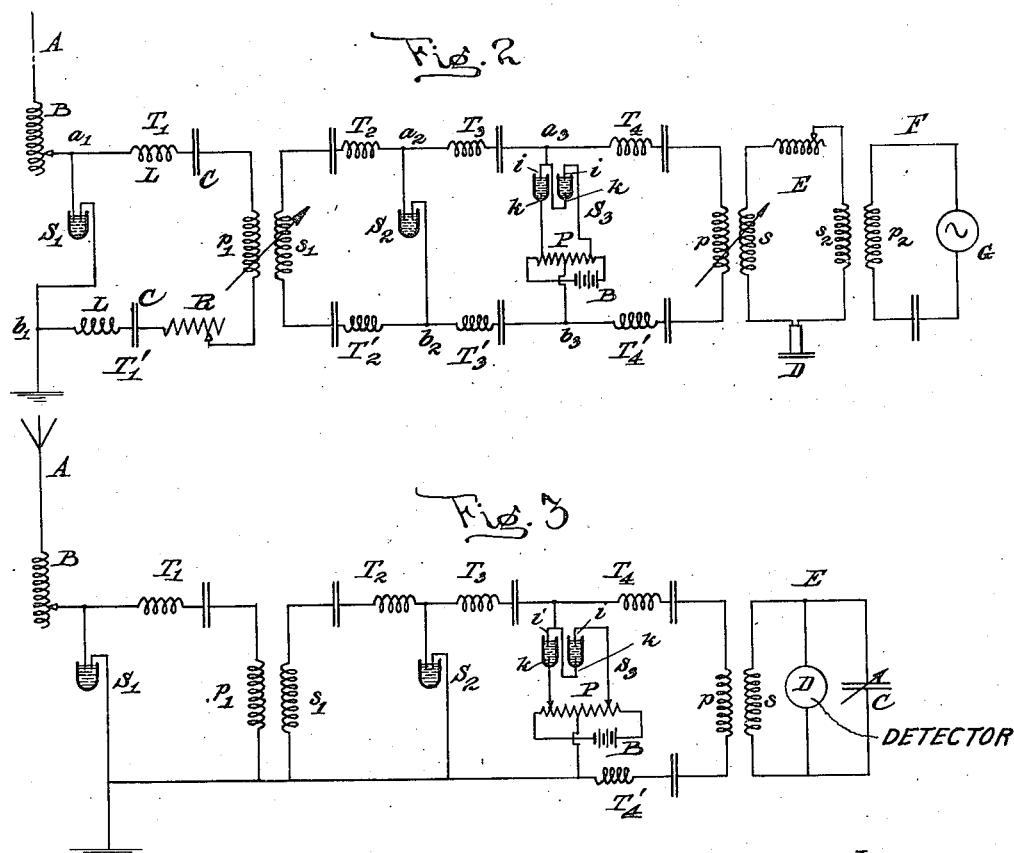

UNITED STATES PATENT OFFICE.

FREDERICK K. VREELAND, OF MONTCLAIR, NEW JERSEY.

RECEIVING SYSTEM FOR RADIO TELEGRAPHY AND TELEPHONY.

1,407,103.  Specification of Letters Patent.  Patented Feb. 21, 1922.

Application filed February 17, 1917. Serial No. 149,166.

*To all whom it may concern:*

Be it known that I, FREDERICK K. VREELAND, a citizen of the United States, residing at Montclair, county of Essex, State of New Jersey, have invented a certain new and useful Improvement in Receiving Systems for Radio Telegraphy and Telephony, of which the following is a specification.

My invention relates to an improved receiving system for radio telegraphy or telephony whereby the efficiency and clarity of the reception is improved. The invention has for its particular object the elimination of interference by strays or foreign impulses, whether emanating from other radio transmitters or produced by atmospheric or "static" disturbances. While the invention is highly effective in excluding artificial radio oscillations of foreign frequencies, it is particularly adapted to the much more difficult function of preventing objectionable interference with the received signals by atmospheric or "static" strays. The difficulty of successfully overcoming or preventing the disturbances due to atmospheric or "static" strays arises not only from the great intensity of such disturbances, but particularly from the fact that they are not simple harmonic oscillations, but, are usually strongly damped or aperiodic. Such damped impulses are capable of exciting oscillations in a tuned resonant circuit, irrespective of its frequency, and therefore they cannot be eliminated by ordinary methods of tuning.

In Letters Patent, No. 1,239,852, dated September 11, 1917, I have described a receiving apparatus operating on the "beats" principle, that is to say, the principle of differential frequencies, in which an amplifying detector is suggested which is itself largely effective in avoiding interference by strays, as I will hereafter explain.

In Letters Patent No. 1,315,584, dated September 9, 1919, I have described a receiving system including a baffle circuit which is also very largely effective to this end. In carrying out the present invention I may utilize either or both of these devices, together with other features, including an intensity selective device, whereby the effectiveness of the system in its capacity to eliminate strays is greatly increased.

In order that the invention may be better understood, attention is directed to the accompanying drawings forming a part of this specification, and in which—

Figure 1 is a diagrammatic view of a receiving system employing a beats receiver and showing a single electrolytic cell used as an intensity selective device;

Figure 2 a corresponding view of a system adapted to receiving either undamped oscillations or damped oscillations, as from an ordinary spark oscillator, and showing a baffle circuit with three intensity selective devices of gradually decreasing ruggedness and increasing sensitivity, which effect a progressive elimination of the strays;

Figure 3 a corresponding view showing a system with an asymmetrical baffle circuit.

In all of the above views corresponding parts are indicated by the same reference characters.

I will first explain the use of the invention in connection with a beats receiver. A beats receiver such as I have described in my patent first above referred to possesses, as I have stated, a considerable inherent stray-reducing power, owing to its property of amplifying sustained signal impulses of suitable frequency, while strongly damped or aperiodic strays, which do not produce beats, are not amplified. Suppose, for example, the detector is an electrostatic telephone, or other square-law detector of such sensitivity that it will give a clearly audible signal in response to a potential difference of one volt when not excited. If now the detector be excited by local oscillations to a potential difference of 250 volts, at a frequency slightly different from the signal frequency, its sensitivity will be increased 1,000 fold; that is, a sustained signal impulse of .001 volt will giving a potential difference of .001 volt will operate the detector with a force proportional to $4 \times .001 \times 250 = 1$, which force is equal to that produced by a potential difference of one volt when the detector is not excited as explained at length in my said patent. At the same time, stray impulses which have not the power of producing beats with the local oscillations and hence are not amplified, will require a potential difference of one volt, or 1000 times the signal intensity, to affect the detector with equal force. Any strays, therefore, less than 1000 times as strong as the signal impulses will not seriously interfere with their reception. Stronger disturbances may be eliminated by the use of an intensity selective device, which is a particular feature of the present invention. By "intensity selective device" I mean a device which has the power of selectively discriminating between impulses of different intensities, and specifically the property of permitting the passage of strong impulses impressed upon it with proportionately greater freedom than weaker ones. Such a device may be utilized to diminish the effect of powerful strays on the receiver while not weakening the feebler signal impulses; or specifically to divert from the receiver impulses or strays stronger than a given intensity, while not materially diverting the weaker signal impulses. When these signal impulses are amplified they will preponderate over the remnant of the strays sufficiently to avoid interference. It may also be used to divert strays that are weaker than the signal impulses, with the aid of a frequency selective device, as hereafter explained.

I prefer to use as an intensity selective device an electrolytic cell or cells, having an electrode or electrodes of suitable small size, the cell or cells being preferably shunted across or arranged as a by-pass to the receiving system in such a manner as to divert or shunt the powerful strays from the receiver, but not to divert the signal impulses.

A simple arrangement of this type is shown in Figure 1, where A is an antenna or collecting circuit, B is a loading or tuning coil, and E is a receiver circuit inductively connected to the collecting circuit by a transformer $p\ s$. The receiver circuit E includes a detector D, which is shown as an electrostatic telephone serving also in a tuning capacity. The electrostatic detector D is excited by a sustained oscillation of slightly different frequency from the sustained signal oscillation, produced by a local oscillator or generator G coupled to the receiver circuit by a transformer $p_2\ s_2$. The connection between the receiver circuit E and the antenna A includes the baffle elements T T', each of which is tuned to the signal frequency. An electrolytic cell or intensity selective device S is connected to the system between points $a$ and $b$, thus constituting a by-pass with respect to the baffle elements T T' and the receiver circuit E. The cell S is so designed and constructed as to offer free passage to impulses beyond a given intensity applied to its terminals, while excluding weaker impulses. Powerful strays picked up by the antenna are thus shunted through the cell S to ground, while the weaker signal impulses are excluded from the by-pass and find free passage through the baffle elements T T' to the receiver circuit E, where they are superimposed on the local oscillations of slightly different frequency produced by the generator G, thus producing beats which are detected by the amplifying detector D.

The baffle elements T T' greatly increase the effectiveness of the intensity selective device S because of their frequency selective property. Being tuned to the signal frequency their reactance to the signal impulses is zero, but their reactance to any other frequency is high. The points $a\ b$ therefore will be points of small potential difference at the signal frequency, but of relatively large potential difference for any other frequency, or for aperiodic impulses, which thus tend more strongly to escape through the by-pass. By this combination of an intensity selective device S with a frequency selective device T T', the effectiveness of the intensity selective device is greatly increased. It thus diverts from the receiver circuit not only strays that are stronger than the signal impulses but may even divert strays that are much weaker than the signal impulses since such strays are impressed upon it with proportionately greater intensity than the signal impulses.

While the use of the baffle circuit or frequency selective device is thus highly desirable in connection with the intensity selective device, it is not essential and the apparatus will be effective even though the cell shunts strong signal impulses to the same extent that it shunts strays. In such case weaker signal impulses, or the remnant of strong signal impulses which is not diverted, will be amplified by the receiver so that they will produce a stronger signal than such remnant of the strays as may escape the by-pass and enter the receiving system. The baffle element is desirable, however, not only to increase the effectiveness of the intensity selector, but also for an additional reason which I will explain.

When the local exciting current of a beats system is large with respect to the signal current, oscillations of considerable intensity may escape through the transformer $p,\ s$. These oscillations, if applied to the cell S in full force, might be so powerful as to impair its effectiveness in diverting strays. By the use of the baffle elements T T' their effect on the intensity selector may be reduced to any desired value, since the points $a\ b$ will then be points of small potential difference to the local oscillations as well as to the signal impulses, the difference of frequency being small. The local oscillations may be used to polarize the cell S as hereafter explained and thus increase its sensitivity, the system being so proportioned as to give the requisite polarizing voltage between the points $a\ b$. If desired a plurality of intensity selectors S may be used as hereafter explained, the first diverting in a large measure the more powerful strays and the others diverting the remainder that may escape the first selection; but usually one will be sufficient when an amplifying beats receiver is used.

Preferably I employ the intensity selective device in connection with a receiving system having a baffle circuit offering but little impedance to the signal impulses but great impedance to the strays, as I described in my application filed March 22, 1916, Serial No. 85,773. It is also desirable, though not of course necessary, to utilize with the system a receiver operating on the beats principle owing to its inherent stray-reducing power.

The invention is not limited to use with an amplifying detector, nor with the beats system of receiving, but it is also applicable to other receiving systems, including receivers of damped oscillations from an ordinary spark oscillator. With such a system it is usually desirable to employ a plurality of intensity selectors, together with a plurality of baffle elements. Two examples of this type are shown in Figures 2 and 3. In the former I have illustrated a beats receiver as in Fig. 1; in the latter an ordinary receiver of damped oscillations, though either type of receiver might be used in either arrangement. In Fig. 2 A is an antenna or receiving circuit, $T_1, T_1', T_2, T_2', T_3, T_3'$, etc. are baffle elements, each comprising an inductance L and capacity C, and each tuned to the signal frequency. A plurality of electrolytic cells or other intensity selective devices $S_1$ $S_2$ and $S_3$ are shunted across the baffle elements at $a_1$ $b_1$ $a_2$ $b_2$ $a_3$ $b_3$ etc., these points being points of small potential difference for the signal impulses but relatively large potential difference for strays or foreign impulses. An oscillation transformer $p$ $s$ couples the baffle circuit to the receiver circuit E, which, as here illustrated, is similar to that shown in Fig. 1. The electrolytic cells or other intensity selectors $S_1, S_2, S_3$ are made progressively sensitive. The first selector $S_1$ is made rugged so that it will not be injured by the most powerful atmosphere disturbances. This will divert in large measure the most powerful strays. The residue which is not diverted but succeeds in passing the baffle elements $T_1$ $T_1'$ then encounters the baffle elements $T_2$ $T_2'$ and is diverted by the more sensitive selector $S_2$, and this process may be repeated until the strays are practically eliminated.

Inasmuch as a powerful aperiodic or strongly damped stray may excite oscillations in a resonant circuit, irrespective of its frequency, at least a part of the receiving system should be made with sufficient damping to prevent the setting up of free oscillations therein. Preferably the first baffle unit should be so strongly damped as to be incapable of sustaining and transmitting free oscillations to the receiver circuit. Thus in Figure 2 that portion of the baffle system which comprises the baffle elements $T_1$ and $T_1'$ is so constructed that it cannot sustain prolonged free oscillations and it is coupled to the remainder of the system by a transformer $p_1$ $s_1$ whose coupling is sufficiently loose to prevent the transmission of such strongly damped currents as may escape the intensity selector $S_1$. The damping of the circuit $T_1$ $T_1'$, and the loose coupling of the transformer $p_1$ $s_1$ should not however be sufficient to obstruct the passage of the more or less sustained signal impulses. To this end I prefer to get the requisite damping by diminishing the loading of the circuit rather than by increasing its resistance; in other words, by making the circuit with relatively small self-induction and large capacity. The succeeding baffle elements $T_2$ $T_3$ &c. should be more heavily loaded in progressive sequence. An adjustable resistance R, or its equivalent, may be included in the baffle circuit $T_1$ $T_1'$ if desired to control its damping.

While I prefer to arrange the baffle elements symmetrically on opposite sides of the receiving circuit, this is not necessary. The lower series of baffle elements may be omitted and each by-pass directly grounded as indicated in Figure 3. Preferably, however, at least one baffle element $T_4'$, Figure 3, is retained between the receiver circuit and ground, to eliminate any disturbances that might result if the ground connection had a considerable impedance. The receiver circuit shown in this Figure comprises a detector D and the usual tuning elements C, s.

The invention is not limited to the use of any particular form of intensity selective device. I prefer, however, to use one or more electrolytic cells having suitably small electrodes, or at least anodes, polarized by a local source or without initial polarization. An example of electrolytic cell suitable for this purpose is one having platinum electrodes in an acid or alkaline solution. The cell may be symmetrical, having both electrodes alike, or asymmetrical with a small electrode and a large electrode, and when polarized cells are used they are arranged in pairs as shown at $S_3$ Figures 2 and 3. Usually it is preferable to employ a symmetrical cell with relatively large electrodes for the rough selector and polarized or asymmetrical pairs for the more sensitive selectors.

While I do not wish to limit my invention to any theory of operation, the action of the cell when used as an intensity selective device may be explained as follows:

A cell of this type under the influence of an alternating electromotive force acts as a capacity in series with a resistance. As the electromotive force impressed on the terminals rises from zero, current will flow through the cell sufficient to polarize the electrodes to a point where the counter electromotive force equals the electromotive force applied to the terminals, minus that consumed in resistance or other energy losses. When the impressed electromotive force is small the counter electromotive force for given electrodes is approximately proportional to the amount of the products of decomposition, that is, to the integral polarizing current. Hence the cell reacts as if it possessed a capacity as well as a resistance. When, however, the applied electromotive force is sufficiently great, the polarization no longer follows the linear law and the apparatus shows its selective property, strong impulses no longer being opposed by a proportionate counter electromotive force. The cell then overflows, as it were, and the strong impulse is allowed to pass through it with little opposition. Weaker impulses which are incapable of polarizing the cell to the overflow point will be practically excluded, the current flowing through the cell being only that resulting from the apparent or polarization capacity of the cell. A cell or pair of cells may be designed for any desired overflow sensitivity. Small electrodes (or specifically small anodes, since the counter electromotive force resides mainly at the anode surface in case of an oxygen anode) give the highest sensitivity since the apparent capacity is small and a small current is sufficient to polarize them to the overflow point. The sensitivity of the cell may be further increased by giving it an initial polarization near the overflow point so that a small additional electromotive force will cause the cell to overflow and permit a large current to pass. The cell is thus intensity-selective in a high degree, since it gives relatively free passage to an impulse strong enough to pass the overflow point, but practically excludes impulses which do not reach this point, the only current which then passes through the cell being that resulting from its apparent capacity, which is very small in the case of sensitive cells and larger in the rough selectors having large electrodes. When polarized cells are employed they are preferably used in asymmetrical pairs, as shown at $S_3$, Figures 2 and 3, each cell having a small anode $i$ and a larger cathode $k$. Mechanical asymmetry however is not necessary because a cell when polarized is inherently asymmetrical even though the electrodes be of the same size. A pair of cells may be conveniently polarized by a single battery B and potentiometer P, as shown in Figures 2 and 3, although other arrangements for polarizing the cells may obviously be employed. I prefer to use a symmetrical unpolarized cell with relatively large electrodes for the first rough selector and an asymmetrical polarized pair with small anodes for the final selector, the intermediate slectors having progressively increasing sensitivity.

Inasmuch as a cell with large electrodes has a relatively large apparent capacity which may act as a material shunt to the signal impulses, it is desirable to make the resistance of the accompanying baffle circuit small with respect to the apparent impedence of the cell or by-pass circuit for the signaling frequency, so that only a small part of the signal impulse will be shunted. Conversely the cell or circuit should have a relatively large ohmic resistance. While this will somewhat diminish its shunting ratio for strays—that is the ratio of the stray current which is diverted through the cell to that which escapes into the next baffle element—the absolute value of the shunted current will be large. The remaining stray current, now greatly reduced, may then be applied to a more sensitive and less rugged cell, and the process repeated as often as necessary. The first overflow circuit should thus preferably be rugged, with relatively large resistance and relatively large apparent capacity, and the accompanying baffle element with relatively small resistance and small loading; the last overflow circuit should be highly sensitive, with lower resistance and small capacity, and accompanied by a heavily loaded baffle element.

The diverting power of the intensity selectors may be varied over a wide range by suitably proportioning their electrical constants with reference to the constants of the baffle elements. In some cases it is desirable to so proportion the system that signal impulses of moderate intensity will not be appreciably weakened, but impulses of excessive strength, even though of the signal frequency, will affect the intensity selector with sufficient intensity to be partially diverted and thus reduced in strength, so that overpowering or deafening signals in the receiver are avoided. The signal strength may thus be limited to any desired maximum.

Having now described my invention, what I claim as new therein and desire to secure by Letters Patent, is as follows:

1. In a receiving system for radiant energy, the combination with an antenna or collecting circuit, of a receiving apparatus and an intensity selective device and signal discriminating means whereby the intensity selective device operates with relatively greater effect upon stray impulses than upon signal impulses, substantially as set forth.

2. In a receiving system for radiant energy, the combination with an antenna or collecting circuit, of a receiving apparatus, signal discriminating means and an intensity selective device cooperating with the signal discriminating means to divert a large portion of the stray impulses from the receiver without materially diverting signal impulses, substantially as set forth.

3. In a receiving system for radiant energy, the combination with an antenna or collecting circuit, of a receiving apparatus, an intensity selective device and signal discriminating means whereby the intensity selective device receives a relatively stronger impetus from strays than from signal impulses, substantially as set forth.

4. In a receiving system for radiant energy, the combination with an antenna or collecting circuit, of a receiving apparatus and an intensity selective device applied to the receiving system between points of large potential difference for stray impulses and relatively small potential difference for signal impulses, substantially as set forth.

5. In a receiving system for radiant energy, the combination with an antenna or collecting circuit, of a receiving apparatus, an intensity selective device, and frequency selective means acting preferentially to impress strays on the intensity selective device with relatively different effect from that of signal impulses, substantially as set forth.

6. In a receiving system for radiant energy, the combination with an antenna or collecting circuit, of a receiving apparatus, an intensity selective device, and frequency selective means acting preferentially to impress strays on the intensity selective device with relatively greater effect from that of signal impulses, substantially as set forth.

7. In a receiving system for radiant energy, the combination with an antenna or collecting circuit of a baffle circuit affording free passage to the signal impulses but obstructing the flow of foreign impulses or strays, receiving apparatus associated therewith, a by-pass circuit connected to the baffle circuit at points of small potential difference for signal impulses and relatively large potential difference for strays, and an intensity selective device in the by-pass circuit, substantially as set forth.

8. In a receiving system for radiant energy, the combination with an antenna or collecting circuit, of a receiving apparatus and a plurality of intensity selective devices adapted to divert successively stray impulses from the receiving apparatus, substantially as set forth.

9. In a receiving system for radiant energy, the combination with an antenna or collecting circuit, of a receiving apparatus and a plurality of intensity selective devices of progressive sensitivity adapted to divert stray impulses from the receiving apparatus, substantially as set forth.

10. In a receiving system for radiant energy, the combination with an antenna or collecting circuit, of a receiving apparatus, a frequency selective circuit and a plurality of intensity selective devices of progressive sensitivity so associated therewith as to be inappreciably affected by signal impulses of a given frequency but relatively strongly affected by other impulses, substantially as set forth.

11. In a receiving system for radiant energy, the combination with an antenna or collecting circuit, of a baffle circuit affording free passage to the signal impulses but obstructing the flow of foreign impulses or strays, a receiving apparatus associated therewith, a plurality of by-pass circuits connected to the baffle circuit at points of small potential difference for signal impulses and relatively large potential difference for strays, and an intensity selective device in each by-pass circuit, substantially as set forth.

12. In a receiving system for radiant energy, the combination with an antenna or collecting circuit, of a baffle circuit affording free passage to the signal impulses but obstructing the flow of foreign impulses or strays, a receiving apparatus associated therewith, a plurality of by-pass circuits connected to the baffle circuit at points of small potential difference for signal impulses and relatively large potential difference for strays, and an intensity selective device in each by-pass circuit, the intensity selective devices being of progressive sensitivity, substantially as set forth.

13. In a receiving system for radiant energy, the combination with an antenna or collecting circuit, of a plurality of baffle elements of progressively increasing loading, affording free passage to the signal impulses but obstructing the flow of foreign impulses or strays, a receiving apparatus associated therewith, a plurality of by-pass circuits connected to the system of baffle elements at points of small potential difference for signal impulses and relatively large potential difference for strays, and an intensity selective device in each by-pass circuit, the intensity selective devices being of progressive sensitivity, substantially as set forth.

14. In a receiving system for radiant energy, the combination with an antenna or collecting circuit, of a receiving apparatus and an electrolytic cell associated therewith and operating as an intensity selective device to divert stray impulses from the receiving apparatus, substantially as set forth.

15. In a receiving system for radiant energy, the combination with an antenna or collecting circuit, of a receiving apparatus and a plurality of electrolytic cells associated therewith and constituting intensity selective devices to divert stray impulses from the receiving apparatus, substantially as set forth.

16. In a receiving system for radiant energy, the combination with an antenna or collecting circuit, of a receiving apparatus and a plurality of electrolytic cells associated therewith and constituting intensity selective devices to divert stray impulses from the receiving apparatus, the said cells being of progressive sensitivity, substantially as set forth.

17. In a receiving system for radiant energy, the combination with an antenna or collecting circuit, of a receiving apparatus and a polarized electrolytic cell associated therewith and acting as an intensity selective device to divert stray impulses from the receiving apparatus, substantially as set forth.

18. In a receiving system for radiant energy, the combination with an antenna or collecting circuit, of a receiving apparatus and a plurality of polarized electrolytic cells associated therewith and acting as intensity selective devices to divert stray impulses from the receiving apparatus, substantially as set forth.

19. In a receiving system for radiant energy, the combination with an antenna or collecting circuit, of a receiving apparatus and a plurality of polarized electrolytic cells associated therewith and acting as intensity selective devices to divert stray impulses from the receiving apparatus, said cells being of progressive sensitivity, substantially as set forth.

20. In a receiving system for radiant energy, the combination with an antenna or collecting circuit, of a receiving apparatus, an unpolarized electrolytic cell associated therewith and a polarized electrolytic cell also associated therewith, said cells acting as intensity selective devices to divert stray impulses from the receiving apparatus, substantially as set forth.

21. In a receiving system for radiant energy, the combination with an antenna or collecting circuit, of a receiving apparatus, an electrolytic cell associated therewith, and frequency selective means acting preferentially to impress strays on the electrolytic cell with relatively different effect from that of signal impulses, substantially as set forth.

22. In a receiving system for radiant energy, the combination with an antenna or collecting circuit, of a receiving apparatus, a polarized electrolytic cell associated therewith, and frequency selective means acting preferentially to impress strays on the cell with relatively different effect from that of signal impulses, substantially as set forth.

23. In a receiving system for radiant energy, the combination with an antenna or collecting circuit, of a baffle circuit affording free passage to the signal impulses but obstructing the flow of foreign impulses or strays, receiving apparatus associated therewith, a by-pass circuit connected to the baffle circuit at points of small potential difference for signal impulses and relatively large potential difference for strays, and an electrolytic cell in the by-pass circuit, substantially as set forth.

24. In a receiving system for radiant energy, the combination with an antenna or collecting circuit, of a baffle circuit affording free passage to the signal impulses but obstructing the flow of foreign impulses or strays, receiving apparatus associated therewith, a by-pass circuit connected to the baffle circuit at points of small potential difference for signal impulses and relatively large potential difference for strays and a polarized electrolytic cell in the by-pass circuit, substantially as set forth.

25. In a receiving system for radiant energy, the combination with an antenna or collecting circuit, of a baffle circuit affording free passage to the signal impulses but obstructing the flow of foreign impulses or strays, receiving apparatus associated therewith, a plurality of by-pass circuits connected to the baffle circuit at points of small potential difference for signal impulses and relatively large potential difference for strays and an intensity selector in each by-pass circuit, substantially as set forth.

26. In a receiving system for radiant energy, the combination with an antenna or collecting circuit, of a differential frequency or beats receiving apparatus and an intensity selective device cooperating with signal discriminating means to divert stray impulses from the receiving apparatus, substantially as set forth.

27. In a receiving system for radiant energy, the combination with an antenna or collecting circuit, of a differential frequency or beats receiving apparatus and an electrolytic cell cooperating with signal discriminating means to divert stray impulses from the receiving apparatus, substantially as set forth.

28. In a receiving system for radiant energy, the combination with an antenna or collecting circuit, of a differential frequency or beats receiving apparatus and a polarized electrolytic cell cooperating with signal discriminating means to divert stray impulses from the receiving apparatus, substantially as set forth.

29. In a receiving system for radiant energy, the combination with an antenna or collecting circuit, of a differential frequency or beats receiving apparatus, and a plurality of intensity selective device cooperating with frequency selective means to divert stray impulses from the receiving apparatus, substantially as set forth.

30. In a receiving system for radiant energy, the combination with an antenna or collecting circuit, of a differential frequency or beats receiving apparatus, and a plurality of intensity selective devices of progressive sensitivity adapted to divert stray impulses from the receiving apparatus, substantially as set forth.

31. In a receiving system for radiant energy, the combination with an antenna or collecting circuit, of a differential frequency or beats receiving apparatus, and a plurality of electrolytic cells cooperating with frequency selective means to divert stray impulses from the receiving apparatus, substantially as set forth.

32. In a receiving system for radiant energy, the combination with an antenna or collecting circuit, of a differential frequency or beats receiving apparatus, and a plurality of electrolytic cells adapted to divert stray impulses from the receiving apparatus, said cells being of progressive sensitivity, substantially as set forth.

33. In a receiving system for radiant energy, the combination with an antenna or collecting circuit, of a differential frequency or beats receiving apparatus, an intensity selective device associated therewith, and frequency selective means acting preferentially to impress strays on the intensity selective device with relatively different effect from that of signal impulses, substantially as set forth.

34. In a receiving system for radiant energy, the combination with an antenna or collecting circuit, of a baffle circuit affording free passage to the signal impulses but obstructing the flow of foreign impulses or strays, a differential frequency or beats receiving apparatus associated therewith, a by-pass circuit connected to the baffle circuit at points of small potential difference for signal impulses and relatively large potential difference for strays, and an intensity selective device in the by-pass circuit, substantially as set forth.

35. In a receiving system for radiant energy, the combination with an antenna or collecting circuit, of a baffle circuit affording free passage to the signal impulses, but obstructing the flow of foreign impulses or strays, a differential frequency or beats receiving apparatus associated therewith, a plurality of by-pass circuits connected to the baffle circuit at points of small potential difference for signal impulses and relatively large potential difference for strays, and an intensity selective device in each by-pass circuit, substantially as set forth.

This specification signed and witnessed this sixteenth day of February, 1917.

FREDERICK K. VREELAND.

Witnesses:
A. E. RENTON,
J. G. McDERMOTT.